US011157812B2

(12) United States Patent
McCourt et al.

(10) Patent No.: US 11,157,812 B2
(45) Date of Patent: Oct. 26, 2021

(54) SYSTEMS AND METHODS FOR TUNING HYPERPARAMETERS OF A MODEL AND ADVANCED CURTAILMENT OF A TRAINING OF THE MODEL

(71) Applicant: Intel Corporation, Santa Clara, CA (US)

(72) Inventors: Michael McCourt, San Francisco, CA (US); Taylor Jackie Springs, San Francisco, CA (US); Ben Hsu, San Francisco, CA (US); Simon Howey, San Francisco, CA (US); Halley Nicki Vance, San Francisco, CA (US); James Blomo, San Francisco, CA (US); Patrick Hayes, San Francisco, CA (US); Scott Clark, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/849,422

(22) Filed: Apr. 15, 2020

(65) Prior Publication Data
US 2020/0327412 A1    Oct. 15, 2020

Related U.S. Application Data

(60) Provisional application No. 62/833,895, filed on Apr. 15, 2019.

(51) Int. Cl.
*G06N 3/08*    (2006.01)
(52) U.S. Cl.
CPC ..................... *G06N 3/08* (2013.01)
(58) Field of Classification Search
CPC .......................................................... G06N 3/08
See application file for complete search history.

(56) References Cited

U.S. PATENT DOCUMENTS 7,363,281 B2    4/2008   Jin et al.
8,364,613 B1    1/2013   Lin et al.
(Continued)

FOREIGN PATENT DOCUMENTS

WO    2018213119    11/2018

OTHER PUBLICATIONS

Rasley, Jeff, Yuxiong He, Feng Yan, Olatunji Ruwase, and Rodrigo Fonseca. "Hyperdrive: Exploring hyperparameters with pop scheduling." In Proceedings of the 18th ACM/IFIP/USENIX Middleware Conference, pp. 1-13. 2017. (Year: 2017).*

(Continued)

*Primary Examiner* — Alexey Shmatov
*Assistant Examiner* — Casey R. Garner
(74) *Attorney, Agent, or Firm* — Hanley, Flight & Zimmerman, LLC

(57) ABSTRACT

A system and method for tuning hyperparameters and training a model includes implementing a hyperparameter tuning service that tunes hyperparameters of a model that includes receiving, via an API, a tuning request that includes: (i) a first part comprising tuning parameters for generating tuned hyperparameter values for hyperparameters of the model; and (ii) a second part comprising model training control parameters for monitoring and controlling a training of the model, wherein the model training control parameters include criteria for generating instructions for curtailing a training run of the model; monitoring the training run for training the model based on the second part of the tuning request, wherein the monitoring of the training run includes periodically collecting training run data; and computing an advanced training curtailment instruction based on the training run data that automatically curtails the training run prior to a predefined maximum training schedule of the training run.

20 Claims, 3 Drawing Sheets

(56) References Cited

U.S. PATENT DOCUMENTS

| | | |
|---|---|---|
| 9,786,036 B2 | 10/2017 | Annapureddy |
| 9,858,529 B2 | 1/2018 | Adams et al. |
| 10,217,061 B2 | 2/2019 | Hayes et al. |
| 10,282,237 B1 | 5/2019 | Johnson et al. |
| 10,379,913 B2 | 8/2019 | Johnson et al. |
| 10,445,150 B1 | 10/2019 | Johnson et al. |
| 10,528,891 B1 | 1/2020 | Cheng et al. |
| 10,558,934 B1 | 2/2020 | Cheng et al. |
| 10,565,025 B2 | 2/2020 | Johnson et al. |
| 10,607,159 B2 | 3/2020 | Hayes et al. |
| 10,621,514 B1 | 4/2020 | Cheng et al. |
| 10,740,695 B2 | 8/2020 | Cheng et al. |
| 2007/0019065 A1 | 1/2007 | Mizes |
| 2008/0183648 A1 | 7/2008 | Goldberg et al. |
| 2009/0244070 A1 | 10/2009 | Mattikalli et al. |
| 2010/0083196 A1 | 4/2010 | Liu |
| 2015/0288573 A1 | 10/2015 | Baughman et al. |
| 2016/0110657 A1 | 4/2016 | Gibiansky et al. |
| 2016/0132787 A1 | 5/2016 | Drevo et al. |
| 2016/0232540 A1 | 8/2016 | Gao et al. |
| 2017/0124487 A1 | 5/2017 | Szeto et al. |
| 2018/0121797 A1 | 5/2018 | Prabhu et al. |
| 2018/0129892 A1 | 5/2018 | Bahl et al. |
| 2018/0240041 A1 | 8/2018 | Koch et al. |
| 2018/0356949 A1 | 12/2018 | Wang et al. |
| 2019/0114537 A1* | 4/2019 | Wesolowski ............. G06N 3/08 |
| 2019/0156229 A1 | 5/2019 | Tee et al. |
| 2019/0220755 A1 | 7/2019 | Carbune et al. |
| 2020/0019888 A1 | 1/2020 | McCourt et al. |
| 2020/0050968 A1* | 2/2020 | Lee .......................... G09B 5/00 |
| 2020/0111018 A1 | 4/2020 | Golovin et al. |
| 2020/0151029 A1 | 5/2020 | Johnson et al. |
| 2020/0202254 A1 | 6/2020 | Hayes et al. |
| 2020/0302342 A1 | 9/2020 | Cheng et al. |

OTHER PUBLICATIONS

Abadi, Martín, Paul Barham, Jianmin Chen, Zhifeng Chen, Andy Davis, Jeffrey Dean, Matthieu Devin et al. "Tensorflow: A system for large-scale machine learning." In 12th {USENIX} symposium on operating systems design and implementation ({OSDI} 16), pp. 265-283. 2016. (Year: 2016).*

Bergstra, James, Daniel Yamins, and David Cox. "Making a science of model search: Hyperparameter optimization in hundreds of dimensions for vision architectures." In International conference on machine learning, pp. 115-123. 2013. (Year: 2013).*

Golovin, Daniel, Benjamin Solnik, Subhodeep Moitra, Greg Kochanski, John Karro, and D. Sculley. "Google vizier: A service for black-box optimization." In Proceedings of the 23rd ACM SIGKDD international conference on knowledge discovery and data mining, pp. 1487-1495. 2017. (Year: 2017).*

Johnson, Alexandra, and Michael McCourt. "Orchestrate: Infrastructure for Enabling Parallelism during Hyperparameter Optimization." arXiv preprint arXiv:1812.07751 (2018). (Year: 2018).*

Dewancker, Ian, Michael McCourt, Scott Clark, Patrick Hayes, Alexandra Johnson, and George Ke. "A stratified analysis of Bayesian optimization methods." arXiv preprint arXiv: 1603.09441 (2016). (Year: 2016).*

Bergstra et al., "Hyperopt: a Python Library for Model Selection and Hyperparameter Optimization," Computational Science & Discovery, 2015, 25 pages.

Diaz et al., "An Effective Algorithm for Hyperparameter Optimization of Neural Networks,"IBM Journal of Research and Development, vol. 61, No. 4/5, 2017, 20 pages.

Golovin et al., "Google Vizier: A Service for Black-Box Optimization," KDD '17, Aug. 12-17, Halifax, NS, Canada, 2017, 10 pages.

Gardner et al., "Bayesian Optimization with Inequality Constraints," Proceedings of the 31st International Conference on Machine Learning, Beijing, China, 2014, 10 pages.

Zou et al., "Regularization and Variable Selection via the Elastic Net," Journal of the Royal Statistical Society, vol. 37, Issue 2, 2005, 20 pages.

Zhou et al., "Combining Global and Local Surrogate Models to Accelerate Evolutionary Optimization," IEEE Transactions on Systems, Man, and Cybernetics—Part C: Applications and Reviews, vol. 37, No. 1, Jan. 2007, 11 pages.

* cited by examiner

Creating a Tuning/Monitoring Request S210

Executing Tuning and Monitoring Services S220

Collecting Checkpoint Data S230

Computing Training Curtailment Instructions S240

Executing Training Curtailment Instructions S245

Creating Global Training Observation S250

FIGURE 2

SYSTEMS AND METHODS FOR TUNING HYPERPARAMETERS OF A MODEL AND ADVANCED CURTAILMENT OF A TRAINING OF THE MODEL

CROSS-REFERENCE TO RELATED APPLICATIONS

This application claims the benefit of U.S. Provisional Application No. 62/833,895, filed 15 Apr. 2019, which is incorporated in its entirety by this reference.

TECHNICAL FIELD

The inventions relate generally to complex model optimization and machine learning fields, and more specifically to a new and useful application program interface and techniques for intelligent hyperparameter optimization and training of models in the computer optimization and machine learning fields.

BACKGROUND

Modern machine learning capabilities are rapidly changing and improving how some of the most complex and data-intensive computing problems are solved. A performance of a machine learning model is governed mainly in the manner(s) in which the machine learning model is trained using data samples as machine learning training input and based on the hyperparameters of the machine learning model set prior to the training of the model. As referenced in passing the hyperparameters of the machine learning models are parameters whose values are set prior to the commencement of the machine learning process rather than derived by the machine learning model during training. Example include the number of trees in a random forest or the number of hidden layers in a deep neural net. Adjusting the values of the hyperparameters of a machine learning model by any amount typically results in a large impact on a performance of the machine learning model.

However, many existing machine learning models are not implemented with optimal hyperparameters well-suited for achieving the best predictive performances. Rather, the many existing machine learning models are implemented with default hyperparameters that have not been optimized for a specific computing problem for which the machine learning models are being used.

Additionally, any existing system that enables optimization of hyperparameters of a machine learning model typically includes an extremely complex interface that may require significant coding capabilities and comprehension of the underlying software and hardware components of the system. Thus, making it difficult to efficiently and effectively enable optimizations and subsequent improvements of the machine learning models.

Thus, there is a need in the machine learning field to create an improved optimization platform to test and improve machine learning models (e.g., in-product machine learning models) and an associated Application Program Interface that enables developers to efficiently and effectively interact with a robust system implementing the evaluation framework. The embodiments of the present application described herein provide technical solutions that address, at least, the need described above, as well as the technical deficiencies of the state of the art described throughout the present application.

SUMMARY OF THE INVENTION

In one embodiment, a method for a tuning hyperparameters of a model and intelligent model training includes implementing a hyperparameter tuning service that tunes hyperparameters of a model that is untrained of subscriber to the hyperparameter tuning service, wherein the hyperparameter tuning service is hosted on a distributed network of computers that: receive, via an application programming interface of the hyperparameter tuning service, a tuning request that includes: (i) a first part comprising tuning parameters for generating tuned hyperparameter values for hyperparameters of the model that is untrained of the subscriber; and (ii) a second part comprising model training control parameters for monitoring and controlling a training of the model, wherein the model training control parameters include one or more criteria for generating instructions for curtailing a training run of the model; monitor the training run for training the model based on the second part of the tuning request, wherein the monitoring of the training run includes periodically collecting training run data; and compute an advanced training curtailment instruction based on the training run data that, when executed, automatically curtails the training run prior to a predefined maximum training schedule of the training run.

In one embodiment, the training run data includes a plurality of checkpoints, wherein each checkpoint of the plurality of checkpoints is created in response to a computation of one or more performance metrics of the model at an end of a corresponding distinct interval of a plurality of distinct intervals of the training run; each checkpoint of the plurality of checkpoints comprises values of the one or more performance metrics of the model computed at the end of the corresponding distinct interval; and computing the advanced training curtailment instructions is based on an assessment of at least one checkpoint of the plurality of checkpoints.

In one embodiment, computing the advanced training curtailment instructions includes: identifying values of one or more performance metrics of the model for a current checkpoint of the plurality of checkpoints; selecting one or more historical checkpoints of the plurality of checkpoints; assessing the values of the one or more performance metrics of the model of the current checkpoint against the values of the one or more performance metrics of the model from the one or more historical checkpoints; and identifying whether to curtail the training run based on the assessment.

In one embodiment, based on the assessment, if the values of the one or more performance metrics of the model of the current checkpoint satisfies an improvement threshold over the values of the one or more performance metrics of the model from the one or more historical checkpoints, computing advanced curtailment instructions that automatically terminate the training run before the predefined maximum training schedule of the training run.

In one embodiment, the advanced training curtailment instructions includes: (a) instructions whether or not to curtail the training run before the completion of all training cycles of the training run; (b) a rationale that identifies which of the one or more performance metrics of the current checkpoint that satisfy or does not satisfy the one or more criteria for generating instructions for curtailing the training run of the model.

In one embodiment, computing the advanced training curtailment instructions includes: identifying values of one or more performance metrics of the model for a current checkpoint of the plurality of checkpoints; computing a rolling average value for each of the one or more performance metrics of the model based on the values of the one or more performance metrics of the model from two or more historical checkpoints of the plurality of checkpoints; assessing the values of the one or more performance metrics of the model of the current checkpoint against the rolling average value of each of the one or more performance metrics of the model from the two or more historical checkpoints; and identifying whether to curtail the training run based on the assessment.

In one embodiment, computing the advanced training curtailment instructions includes: computing a plurality of expected checkpoints based on the training run data, wherein each of the plurality of expected checkpoints comprises a probabilistically expected value for each of the one or more performance metrics at a given interval during the training run of the model, and wherein each of the plurality of expected checkpoints corresponds to one of the plurality of checkpoints; assessing the values of the one or more performance metrics of the model of the current checkpoint against a corresponding one of the plurality of expected checkpoints; and identifying whether to curtail the training run based on the assessment.

In one embodiment, first part of the tuning request is configured to include at least: an identification of one or more hyperparameters of the model that the subscriber requests for tuning; and an identification of the one or more performance metrics of the model that discover values for the one or more hyperparameters optimize.

In one embodiment, the second part of the tuning request is configured to include at least: a setting of the plurality of distinct intervals during the training run at which each of the plurality of checkpoints are generated; a setting of a maximum number of checkpoints for the training run; and a setting of a lookback parameter that indicates a number of a plurality of historical checkpoints that are referenced in the computation of the advanced training curtailment instructions.

In one embodiment, the advanced training curtailment instructions include a model training decision that, when executed, causes an early disposal or an early ejection of the model from the training run that is in progress ahead of the predefined maximum training schedule of the training run.

In one embodiment, the advanced training curtailment instructions control an operational state of the training run that includes one or more of maintaining a continued operation of the training run, a real-time or an immediate discontinuation of an operation of the training run, and a modification of an extent of the operation of the training run.

In one embodiment, the model training control parameters include a frequency parameter that sets a frequency for creating each of the plurality of checkpoints during the training run for the model.

In one embodiment, the hyperparameter tuning service creates instructions for dynamically changing the frequency parameter that, when executed, increases or decreases the frequency for creating each of the plurality of checkpoints during the training run for the model.

In one embodiment, the hyperparameter tuning service creates instructions for changing a number of training epochs in the training run based on a proximity of the one or more performance metrics of the model to a convergence threshold.

In one embodiment, the hyperparameter tuning service staggers an execution of the first part from an execution of the second part of the tuning request by executing the first part at a time earlier or before an initialization and execution of the second part.

In one embodiment, a method for a tuning hyperparameters of a model and intelligent model training includes implementing a hyperparameter tuning service that tunes hyperparameters of a model that is untrained of subscriber to the hyperparameter tuning service, wherein the hyperparameter tuning service is hosted on a distributed network of computers that: receive, via an application programming interface of the hyperparameter tuning service, a tuning request that includes: (i) a first part comprising tuning parameters for generating tuned hyperparameter values for hyperparameters of the model that is untrained of the subscriber; and (ii) a second part comprising model training control parameters for controlling a training of the model, wherein the model training control parameters include one or more criteria for generating instructions for curtailing a training run of the model; monitor the training run for training the model based on the second part of the tuning request, wherein the monitoring of the training run includes periodically collecting training run data; and compute an advanced training curtailment instruction based on the training run data that, when executed, automatically curtails the training run prior to a predefined maximum training schedule of the training run.

In one embodiment, the training run data includes a plurality of checkpoints, wherein each checkpoint of the plurality of checkpoints is created in response to a computation of one or more performance metrics of the model at an end of a corresponding distinct interval of a plurality of distinct intervals of the training run; each checkpoint of the plurality of checkpoints comprises values of the one or more performance metrics of the model computed at the end of the corresponding distinct interval; and computing the advanced training curtailment instructions is based on an assessment of at least one checkpoint of the plurality of checkpoints.

In one embodiment, computing the advanced training curtailment instructions includes: identifying values of one or more performance metrics of the model for a most recent in time checkpoint of the plurality of checkpoints; selecting one or more historical checkpoints of the plurality of checkpoints; assessing the values of the one or more performance metrics of the model of the current checkpoint against the values of the one or more performance metrics of the model from the one or more historical checkpoints; and identifying whether to terminate the training run based on the assessment.

In one embodiment, a method for a tuning hyperparameters of a neural network and intelligent neural network training includes implementing a hyperparameter tuning service that tunes hyperparameters of a neural network that is untrained of subscriber to the hyperparameter tuning service, wherein the hyperparameter tuning service is hosted on a distributed network of computers that: receive, via an application programming interface of the hyperparameter tuning service, a tuning request that includes: (i) a first part comprising tuning parameters for generating tuned hyperparameter values for hyperparameters of the neural network that is untrained of the subscriber; and (ii) a second part comprising neural network training control parameters for controlling a training of the neural network, wherein the neural network training control parameters include one or more criteria for generating instructions for curtailing a training run of the neural network; monitor the training run for training the neural network based on the second part of the tuning request, wherein the monitoring of the training run includes periodically collecting checkpoint data; and compute an advanced training curtailment instruction based on an assessment of the checkpoint data that, when executed, automatically terminates the training run prior to a predefined maximum training schedule of the training run.

In one embodiment, the checkpoint data comprises one or more performance metric values of the neural network at an end of the one of the plurality of distinct periods during the training run; the assessment of the checkpoint data includes: identifying whether the one or more performance metric values of the checkpoint data satisfies a convergence threshold indicating an improvement over one or more performance metric values of the neural network of the one or more historical checkpoint data.

BRIEF DESCRIPTION OF THE FIGURES

FIG. 2 illustrates an example method 200 in accordance with one or more embodiments of the present application.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Overview

In modern model training platforms, modelers may function to monitor the progress of the training of a model. These platforms, in some instances, may provide information relating to one or more training aspects of a given model including information relating to one or more metrics that may be under consideration. In some of these traditional cases, a modeler evaluating the one or more metrics of a given model may perform an evaluation and determine a suitable stopping point of a training of a subject model.

This method of monitoring a training of a model often requires countless hours of an attention of a modeler to the training platform and a reliance on the instrumentation and criteria set by the platform or the like is logical and/or reasonable for the subject model being trained. Thus, in such traditional training schemes, constant live monitoring by a user or modeler may be required to determine whether a full or partial training of a subject model is required and further, the criteria set of early stoppage for partial training of the subject model may not be fully aligned with requirements of the subject model since these stoppage criteria may not be set by the modeler or uniquely tailored to the subject model being trained.

One or more embodiments of the present application provide systems and methods that enable a hands-off approach that reduces a time required in monitoring a training of a modeler and further provides an advance termination and/or training features that enable adjustments of one or more training parameters of a model during or mid-stream a training run. That is, such embodiments provide a training parameter that includes an advanced or early termination feature that allows enables a system or an administrator of a training to curtail a training of a model, based on satisfying one or more metrics, ahead of a scheduled completion time for a given model.

1. A System and/or Service for Tuning a Model

Figure 1:
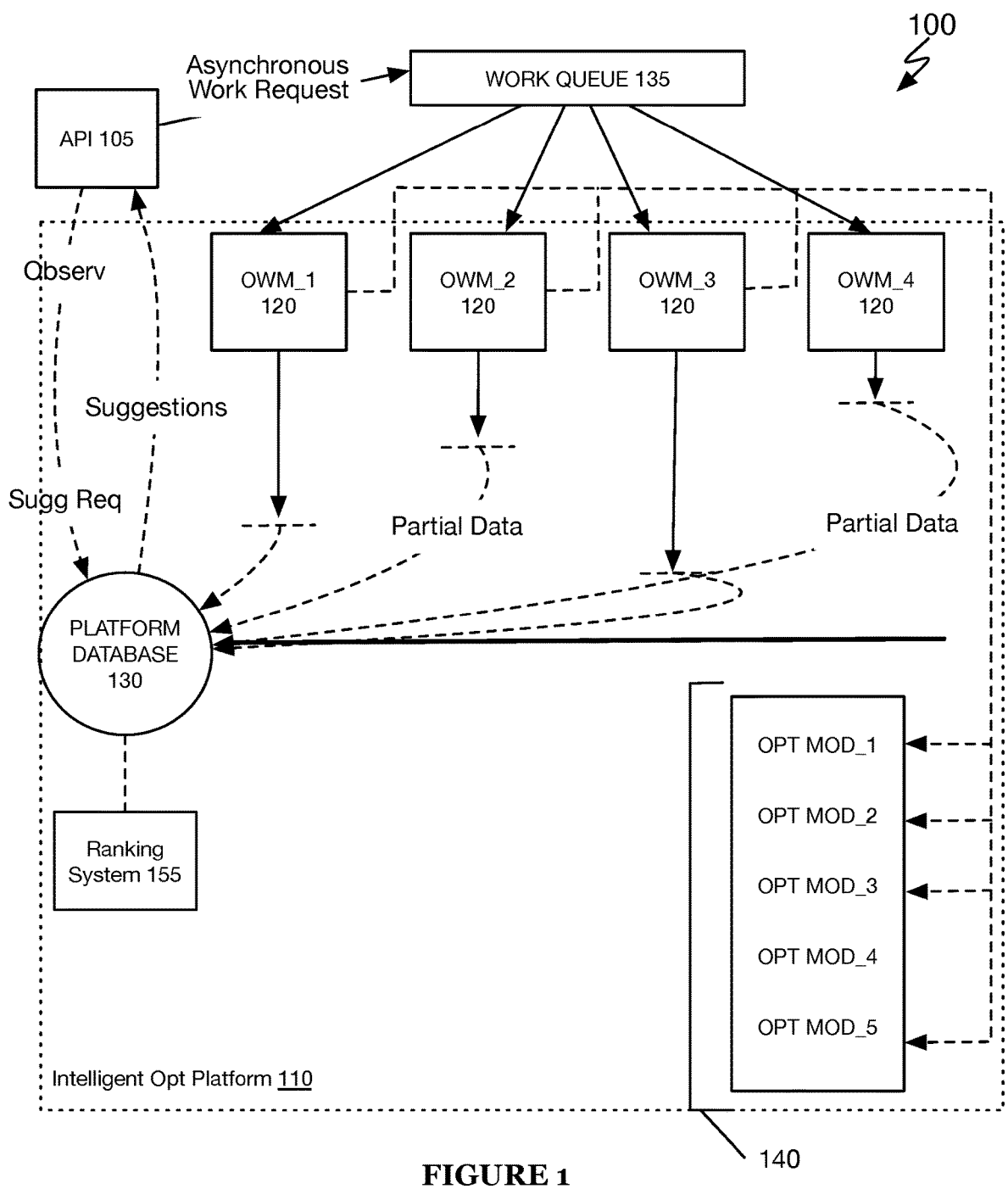
FIG. 1 illustrates a schematic representation of a tuning system 100 in accordance with one or more embodiments of the present application.

As shown in FIG. 1, a tuning/optimization system 100 (model tuning service 100) includes an intelligent application program interface (API) 105, an intelligent model optimization platform 110, a plurality of queue working machines 120, a platform database 130, a shared work queue 135, and an ensemble of optimization models 140.

The system 100 preferably implements an intelligent model optimization platform 110 including an ensemble of Bayesian optimization processes and machine learning techniques that functions to automate an optimization of features of a model, architecture of a model, and hyperparameters of a model using an ensemble of Bayesian optimization techniques, as described in U.S. Pat. No. 10,217,061, which is incorporated herein in its entirety by this reference.

The system 100 functions to implement an intelligent Application Program Interface (API) 105, as described in U.S. Pat. No. 10,282,237 which is incorporated herein in its entirety by this reference, for interacting and implementing complex optimization trials via the remote intelligent optimization platform 110. The API 105 may be specifically designed to include a limited number of API endpoints that reduce of complexity in creating an optimization work request, implementing optimization trials using the work request data, obtaining suggestions and/or results of the optimization trials, and potentially implementing an optimization feedback loop until a suitable optimization of an objective function of the work request is achieved in a minimal amount of time. The optimization work request, as referred to herein, generally relates to an API request that includes one or more hyperparameters that a user is seeking to optimize and one or more constraints that the user desires for the optimization trials performed by the intelligent optimization platform 110.

In a preferred embodiment, the API 105 comprises a Representational State Transfer (ReST) API that relies mainly on a stateless, client-server, cacheable communications protocol and in many cases, the Rest API uses the HTTP protocol in connecting and interacting with software applications over the web and cloud (distributed network systems) services efficiently.

The API 105 may additionally be configured with logic that enables the API 105 to intelligently parse optimization work request data and/or augment the optimization work request data with metadata prior to passing the optimization work request to the shared work queue 135 of the intelligent optimization platform 110. As shown in FIG. 1, a mixed system and process flow is provided that illustrates an example interactions between the API 105 and one or more components of the intelligent optimization platform 110.

The intelligent optimization platform 110 includes the plurality of queue worker machines 120 (which may also be referred to herein as optimization worker machines), the platform data 130, the shared work queue 135 and the ensemble of optimization models 140. The intelligent optimization platform 110 generally functions to interact with the API server implementing the API 105 to receive API requests for implementing new optimization work requests and returning responses or suggestions to the API 105. Using the plurality of intelligent queue worker machines 120, the intelligent optimization platform 110 functions to asynchronously execute a plurality of optimization work requests in real-time and in parallel. This asynchronous execution and parallel processes of the intelligent optimization system 110 provides speed in computing efficiencies in the exploration and exploitation processes (generally, optimization) of features, hyperparameters, models and system architectures.

Additionally, or alternatively, the system enables a user to implement and/or interact with the API 105 in multiple ways including via an API client application and/or via API web browser implemented over the web.

The intelligent optimization platform 110 may be implemented using a combination of computing servers. Preferably, the intelligent optimization platform is implemented via a distributed networked computing system, such as cloud computing systems, that allows the many processes implemented by the intelligent optimization platform 110 to be implemented in parallel and among disparate computers thereby, in some embodiments, mitigating the possibility of failure or bottlenecking in the optimization pipeline of the intelligent optimization platform 110. Accordingly, the intelligent optimization platform 110 may be implemented as a remote web service accessible by multiple clients over the Internet, the Web, or any suitable communication network (e.g., a global area network, a wide area network, a local area network, etc.) that may function to place disparate computing resources in operable connection and communication.

The plurality of intelligent queue worker machines 120 preferably relate to services operating on the intelligent optimization platform 110 that executes code asynchronously with respect to other services or queue working machines of the platform 110. In some embodiments, each of the plurality of intelligent queue worker machines 120 functions to selectively trigger one or more optimization requests to one or more optimization engines of the ensemble of optimization engines 140. And, once the work on the optimization request is completed by the selected optimization engine(s), the queue working machine returns the responses or results to the platform database 130.

The plurality of intelligent queue worker machines 120 may be specifically configured with logic that enables each of the machines 120 to make dynamic and intelligent decisions in the selections of an ensemble component of the plurality of ensemble of optimization models 140. That is, each of the plurality of intelligent queue worker machines may function to selectively choose one or more optimization models of the ensemble 140 to execute one or more portions of an optimization work request.

The ensemble of optimization models 140 preferably includes a plurality of disparate optimization models that operate to optimize hyperparameters, features, models, system architectures and the like using varying optimization algorithms. In a preferred embodiment, the ensemble of optimization models 140 define a core optimization engine of the intelligent optimization platform 110. The features and the parameters of the core optimization engine comprising the ensemble of optimization models 140 may also be optimized continually by one or more of the intelligent queue worker machines 120 (e.g., using Hyperopt, etc.).

The ensemble of optimization models 140 may include any number of models including, for example: a Low-Discrepancy sequence model, a Metric Optimization Engine (MOE) model (and variants thereof; e.g., MOE with one-hot encoding), a Tree-structured Parzen Estimators (TPE) model and variants thereof, a Latin Hypercube model, a Swarm model, and the like. Each of these models of the example ensemble of optimization models may function to encode categorical parameters differently from other member models of the ensemble and may include some interdependencies that require combinations of the models to work together. Each of these models may be individually selectable or selectable in combination by or using the intelligent worker queue machines 120.

In a preferred embodiment, the plurality of intelligent queue working machines 120 may be implemented on a separate computing server than the API 105. In this way, long-running asynchronous processes do not adversely affect (e.g., slow down) a performance of an API computing server and mainly, a capacity of the API computing server to service API requests.

Additionally, the plurality of intelligent queue worker machines 120 include multiple, distinct intelligent queue worker machines 120 that coordinate optimization work request from the shared work queue 135 received via the API 105 with the ensemble of optimization models 140.

The platform database 130 functions to collect and stores any or all values generated by the system 100 including values generated when executing an optimization work request by the intelligent optimization platform 110. Specifically, each of the plurality of intelligent queue worker machines may function to store within the platform database 130 optimized hyperparameter values, optimized hyperparameter values of an optimization work request, suggestions, surrogate models, partial information responses, and the like. The API 105 may be operable communication with the platform database 130 via a communication network and may function to pull suggestions and/or response data via an API call or request.

The machine learning models, optimization models, and/or the ensemble of machine learning models may employ any suitable optimization algorithms and/or machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in implementing the intelligent optimization platform 110 and/or other components of the system 100.

The system 100 may additionally include a surrogate model generator (implemented via one or more of the optimization models 140) that may be implemented by the intelligent optimization platform 110. Specifically, when an API request is received by the system 100 that requests a status or suggestions of a partially completed (or incomplete) optimization work request, the intelligent optimization platform 110 may function to identify candidate data points and other data (including suggested hyperparameter values and optimized hyperparameters values) generated by each of the plurality of intelligent queue worker machines 120 for responding to the partially completed optimization work request and further, may trigger one or more of the optimization models of the ensemble of optimization models to generate a surrogate (or proxy) model that can be used to test the uncertainty and/or the likelihood that a candidate data point would perform well in an external model. In one example, the system 100 may function to obtain hyperparameter values of a most recent job of a first intelligent queue worker machine implementing Hyperopt and cause one of the optimization models 140, such as MOE, to generate the surrogate model using the hyperparameter values to test how well the candidate hyperparameter value data points may perform.

The system 100 may also implement a ranking system 155 that functions to rank multiple suggestions for a given optimization work request (or across multiple optimization work requests for a given user) such that the suggestions having hyperparameter values most likely to perform the best can be passed or pulled via the API 105. The ranking system 155 may be implemented in any suitable manner including by the one or more optimization algorithms of the ensemble 140 that generated the suggestions. For instance, if MOE is used to generate a plurality of suggestions for responding to an optimization work request, the system 100 may function to use MOE to implement the ranking system 155.

It shall be noted that the sub-systems and components of the system 100 may be connected or placed in operable communication using any suitable network and any suitable manner. For instance, the components of the system 100 may be connected directly or indirectly over a network. The network may include any public (e.g., the Internet) or private network (e.g., intranet), a virtual private network, a wireless local area network, a local area network, a wide area network, a wireless wide area network, a global area network, a cellular network, any combination of the aforementioned and the like.

1.1 Model Tuning|Model Training Subsystem

Figure 3:
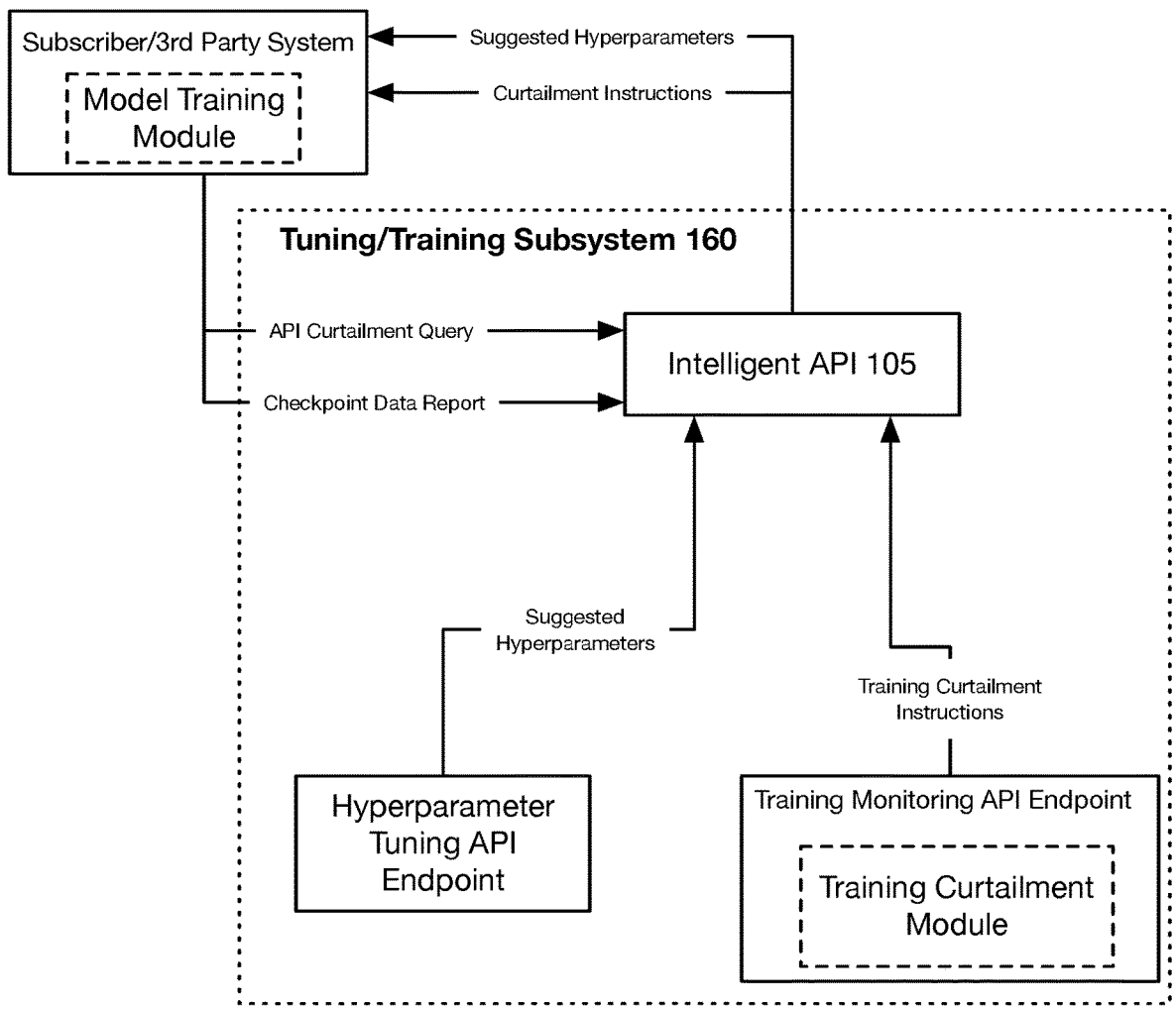
FIG. 3 illustrates an example block and flow diagram for tuning model hyperparameters and monitoring a training of a model in accordance with one or more embodiments of the present application.

As shown in FIG. 3, the tuning system 100 may include a model tuning subsystem 160 that illustrates a subscriber and/or third-party system for training a subject model interfacing directly the intelligent API 105. In some embodiments, as illustrated, the subscriber is able to report checkpoint data as well as query the intelligent API 105 for advanced training curtailment instructions that may instruct the subscriber to continue or terminate a training run for a given model. The intelligent API 105 may directly or indirectly interface with multiple API endpoints including, but not limited to, a hyperparameter tuning API endpoint that generates tuned hyperparameter values and a training monitoring API endpoint that monitors training runs of one or more models and generates advanced training curtailment instructions.

2. Method for Model Training Monitoring and Advanced Model Training Curtailment

As shown in FIG. 2, a method 200 for monitoring a training of a machine learning model and implementing an early termination of a training of the machine learning model includes creating a hyperparameter tuning work request augmented with model training monitoring criteria S210, implementing hyperparameter tuning and model training with service-suggested hyperparameters S220, collecting training run data S230, and computing advance termination instructions S240. The method 200 optionally includes executing advanced termination instructions S245 and optionally generating a global training observation S250.

The method 200 generally functions to enable the monitoring and intelligent/advanced termination of the training of a machine learning model ahead of a predetermined training schedule for the machine learning model. In one or more embodiments, the method 200 may function to enable a subscriber to the tuning service implementing the method 200 to create a hyperparameter tuning experiment for generating optimized hyperparameters, by a hyperparameter tuning service, for a subject model that also enables the hyperparameter tuning service to monitor a training of the subject model and generate intelligent instructions to terminate a training of the model based on data associated with one or more training runs associated with training the subject model. As a result, in some embodiments, the method 200 may reduce the computational resources and/or model training time that is required for meaningfully advancing or rejecting the training of a subject model.

2.1 Creating Tuning Experiment with a Training Run Object

S210, which includes creating a hyperparameter tuning and training monitoring request, may function to enable a configuration of a hyperparameter tuning and training monitoring request via an intelligent API of a hyperparameter tuning service. In some instances, the hyperparameter tuning and training monitoring requests may be referred to herein as simply as a "tuning request" or slight variations thereof. The hyperparameter tuning service preferably includes an independent hyperparameter tuning service at which remote subscribers desiring to optimize one or more hyperparameters of a subject model may submit one or more requests for tuning and in response, the hyperparameter tuning service generates suggestions of one or more service-optimized hyperparameter values for the models of the subscribers. In a preferred embodiment, the hyperparameter tuning service may be implemented by or with the system 100 and may additionally or alternatively, implement all or parts of the method 200 (or the variations of the method 200).

Accordingly, in one or more embodiments, the tuning request may include a multi-part tuning request that includes requests directed towards at least two distinct services of the hyperparameter tuning service. In such embodiments, the tuning request towards the at least two distinct services may include a first part requesting a tuning service for tuning of one or more hyperparameters of a given model and a second part requesting a monitoring and intelligent termination service for monitoring a training of the given model implementing the one or more hyperparameters (with tuned values from the service) and providing intelligent instructions for an advanced curtailment/stopping of the training of the given model earlier than a previously estimated maximum training schedule/time.

2.1.1 First Part of Tuning Request

Additionally, or alternatively, in a preferred embodiment, creating the tuning request preferably includes setting or instrumenting the tuning request with one or more tuning parameters (i.e., tuning parameters) and/or criteria for handling a first part of the tuning request directed towards tuning one or more hyperparameters of a given model and for handling a second part of the tuning request directed towards monitoring a training of the given model and generating advanced model training curtailment instructions during a training period of the given model.

In one or more embodiments, the instrumentation and/or criteria for creating a first part of the tuning request related to tuning hyperparameters of a subject model may include identifying or setting the one or more hyperparameters of the subject model that a subscriber desires to be optimized for improving one or more metric values or performance criteria of the subject model. Additionally, or alternatively, at creation of the first part of the tuning request, a subscriber may function to set bounds (i.e., a maximum and/or a minimum value that each of the one or more hyperparameters may occupy) that define a searchable hyperparameter space for discovering one or more optimal values for the one or more hyperparameters of the subject model. Additionally, tuning request inputs or settings may include, but are not limited to, conditions, an optimization budget, metadata (e.g., job description), inputs that define an objective function (to be optimized) of the model, and the like.

It shall be known that a first part of tuning request for optimizing hyperparameters of a given model may be instrumented in any suitable manner, as described in U.S. Pat. No. 10,217,061, which is incorporated herein in its entirety by this reference, and further, as described in U.S. application Ser. No. 16/194,192, U.S. Pat. No. 10,528, 891, and U.S. application Ser. No. 16/511,320, which are all incorporated herein by this reference in their entireties.

2.1.2 Second Part of Tuning Request

Additionally, or alternatively, in a preferred embodiment, creating the tuning request preferably includes setting or instrumenting the tuning request with one or more tuning parameters (i.e., tuning parameters) and/or criteria for handling a second part of the tuning request directed towards monitoring a training of a subject model and generation of advanced training curtailment instructions for terminating a training of the subject model prior to a predefined training completion schedule.

In one or more embodiments, the instrumentation and/or criteria for creating a second part of the tuning request related to monitoring the training of a subject model and generating training termination instructions that enable an automatic curtailment of the training of the subject model includes setting and/or instrumenting a training run (or training monitoring) object that enables the hyperparameter tuning service to accumulate (via the API) all work associated with executing a tuning service-suggested set of hyperparameters within a training of a subject model. That is, in such embodiments, the instrumentation of the training run object via the API of the hyperparameter tuning service may function to provide a subscriber (a subscriber system or service of a subscriber) a mechanism to report intermediate progress of a training of a subject model towards a converged model and monitor the training progress of the subject model one or more interfaces (e.g., web-accessible interface (website) or the like) of the hyperparameter tuning service. Accordingly, for each time a model is trained, a new training run object may be created by the hyperparameter tuning service that may function to contain and organize training run data associated with the respective model. For example, in some embodiments, when a subject model or a subscriber handling the subject model requests via the API of the hyperparameter tuning service a next set of service-suggested hyperparameter values to try or install in the subject model for a training run, a new training run object may be automatically created for the set of service-suggested hyperparameter.

Additionally, or alternatively, a definition of the training run object for monitoring a training run of a subject model may include and/or otherwise, may be accompanied with additional instrumentation, such as a checkpoint object or the like that enables the progress during a training of the subject model (on a remote service or the like) to be reported to the hyperparameter tuning service. As discussed, in more detail, a checkpoint object of a given tuning request may function to enable a periodic collection and organization of training run data from a training of a subject model via a plurality of distinct checkpoint evaluations that may be performed at distinct or sequential intervals during a training run of the subject model. A checkpoint evaluation preferably functions to create a record of training run data at the end of a distinct training interval during a training run of a subject model. A training run as referred to herein preferably refers to or may be defined as an endeavor to train a machine learning model or the like to perform a task. The endeavor or the training job to train the machine learning model may include training parameters that define a scope and/or operations of the training run, such as, for example, an identification or definition of a subject model (e.g., an algorithmic structure, a neural network, or the like), a number of training cycles through a training dataset (e.g., epochs), training data batch sizes, a training dataset, a maximum training time (e.g., maximum number of epochs and/or any suitable criteria or parameter for training a model toward a desired state (e.g., convergence)).

S210 may additionally, or alternatively, include setting advanced training curtailment criteria, which may include defining one or more early stopping criteria that may function to cause the hyperparameter tuning service to compute advanced training curtailment instructions, as described in more detail below. Setting advanced training curtailment criteria may preferably be implemented via the API of the hyperparameter tuning service and jointly with the setting of the training monitoring/training run criteria. In one or more embodiments, a setting of the advanced training curtailment criteria may be a subset of the criteria and/or parameters of the training monitoring, such that an execution of the advanced training curtailment criteria may be performed in synchronization with various training monitoring criteria, such as checkpoint evaluations and the like.

In some embodiments, setting advanced training curtailment criteria may include setting one or more of a model training type or a desired end state of the model (e.g., type: convergence, etc.) after a training, a lookback (parameter) number or value (i.e., a number of distinct checkpoints considered in a computation of advanced training curtailment instructions), a minimum number of checkpoints for a given training run before a computation of advanced curtailment instructions is performed, and/or any suitable parameter or criteria for computing advanced curtailment instructions.

It shall be known that in some embodiments, one or more of the advanced training curtailment instructions may be set by the hyperparameter tuning service. In a preferred embodiment, in the circumstance that prior training monitoring data has been acquired for a given subscriber and/or for a given model of a subscriber, the prior training monitoring data may be used to inform an optimization or criteria discovery performed the hyperparameter tuning service for selecting or predicting one or more optimal values for each of the parameters and/or criteria for setting or configuring advanced training curtailment criteria within a tuning request.

2.2 Hyperparameter Tuning Experiment and Model Training Monitoring

S220, which includes implementing each of a hyperparameter tuning experiment and a model training run monitoring, may function to execute the hyperparameter tuning experiment for optimizing hyperparameters of a subject model in conjunction with a corresponding execution of the model training run monitoring for a training run of the subject model based on the one or more parameters and/or criteria of a tuning request.

In one or more embodiments, at an initialization of S220, an execution of the hyperparameter tuning experiment and an execution of a model training monitoring may be performed or implemented in a desynchronized fashion or a staggered in which the execution of at least a first instance of the hyperparameter tuning experiment for generating one or more suggestions of optimized hyperparameter values for the model may be performed at a time earlier or before an initialization and execution of the model training monitoring of the model. That is, at an outset of an execution of the tuning request, S220 may function to first execute the first part (i.e., the hyperparameter tuning) of the tuning request and only subsequent to executing the first part, S220 may function to execute the second part of the tuning request. In such embodiments, at least a first set of suggested hyperparameter values should be generated and stored by the hyperparameter service that may be installed into a subject model by a subscriber prior to executing a training run in which the subject model is trained with the suggested hyperparameter values defining the relevant parts of the algorithmic structure of the subject model.

However, it shall be noted that, after at least a first set of suggested hyperparameter values for the subject model are created and installed in a first training run, S220 may function to execute, in parallel, both of the hyperparameter tuning experiments for generating new suggested hyperparameter values for the subject model and the model training run monitoring of the subject model.

Accordingly, in one or more embodiments, the first part of the tuning request including the hyperparameter tuning service may be executed or implemented independent of the second part of the tuning request that includes the monitoring service of the training run of the subject model together with advanced model training curtailment instructions. That is, in some embodiments, S220 may function to generate a plurality of optimized or tuned suggestions for hyperparameter values for a model of the subscriber that will be trained without any input, reliance, or stimulus resulting from an execution of the second part of the tuning request that includes the monitoring of the training run of the model.

2.2.1 Executing Hyperparameter Optimization & Discovery

Accordingly, in one or more tuning sessions of the hyperparameter tuning experiment, S220 may function to generate and/or identify one or more suggestions of hyperparameter values for a subject model. In one or more embodiments, each of the one or more suggestions may include distinct sets of values for the hyperparameters of the subject model that may function to optimize some objective function of the subject model.

Additionally, or alternatively, during a continued execution of the first part of the tuning request, which may include producing a plurality of distinct suggestions of tuned or optimized hyperparameter values for a subject model, the first part of the tuning request may be informed by data resulting from an execution of the second part of the tuning request that includes the monitoring of each distinct training run of the subject model. In such embodiments, data from the monitoring of the training of a subject model may be fed into one or more parts or operations of the hyperparameter tuning service that handles an execution of the first part that may cause an adjustment of one or more optimization sources and/or one or more optimization operations of the hyperparameter tuning service that may function to improve an efficiency in delivering optimized hyperparameters to a subscriber for a given model. For example, in some embodiments, computed training run data and/or performance data (e.g., efficacy metrics) of a model from an execution of the second part including the monitoring of a training of a subject model may inform an execution of the first part regarding one or more regions (of convergence and/or of non-convergence) in a hyperparameter space (i.e., a bounded range of possible hyperparameter values for a set of hyperparameters or the like) that the hyperparameter tuning service should or should not search (e.g., setting a failure region for a search) to find helpful or optimized values for the one or more hyperparameters of the subject model that may be a subject of optimization. In such embodiments, the data and/or derived information from the execution of the second part may inform (or be used as input in) an execution of the first part to an extent that the hyperparameter tuning service may be able to discover optimal hyperparameter values that more quickly (relative to prior suggested hyperparameter values) or more efficiently lead the subject model, during a training run, to convergence or the like (e.g., a desired state of a trained machine learning model, a state in which no significant (relative to convergence threshold) error decrease/performance increase may be achieved by additional training of a subject model).

2.2.2 Executing Model Training Monitoring

Accordingly, in one or more embodiments, S220 may function to implement a model training monitoring for each distinct training run of a subject model incorporating a distinct set of hyperparameter values. That is, for each suggestion of hyperparameter values that is called for installation into a subject model, S220 may function to create a distinct training monitoring object or implement.

In some embodiments, an initialization and/or an execution of a workload associated with an execution of the second part (e.g., training monitoring) of the tuning request may be triggered or caused by an API call (i.e., query via the API) to the hyperparameter tuning service that returns a suggested set of hyperparameter values for a given subject model. That is, S220 may function to identify that a subscriber or training service associated with the subscriber may be calling a suggested set of hyperparameter values that is linked or otherwise associated with a tuning request in which training monitoring of a subject model has been requested and correspondingly, initialize or prepare for an execution of the second part, which may include identifying and preparing storage facilities for training run data, generating metadata (e.g., descriptions of training run data), creating searchable links between data from an execution of the first part and data that will be obtained from an execution of the second part of the tuning request, and/or the like.

Additionally, or alternatively, in some embodiments, an initialization and/or an execution of a workload associated with an execution of the second part of the tuning request may be triggered or caused by a receipt of training run data associated with a subject model being trained with one or suggested hyperparameters from the hyperparameter tuning service.

In one or more embodiments, during an execution of the first part and the second part of the tuning request, the API of the hyperparameter tuning service may be responsible for creating electronic links (e.g., electronically connects) between data derived from an execution of a first part of a tuning request and an execution of a second part of the tuning request. For instance, in some embodiments, the API may function to create a suggestion identifier for each new service-suggested values for the hyperparameters of a subject model and using the suggestion identifier, the API may function to create or derive a unique training run identifier that links the service-suggested values for the hyperparameters to resultant data of the training run. For each distinct service-suggested values for the hyperparameters of a subject model, the API may function to create a new suggestion ID that may be linked to a corresponding training run by the API. Additionally, or alternatively, in some embodiments, the API may link and aggregate all data derived from an execution of the first part and the second part into a collective observation that may be reported back to a subscriber via the API.

2.3 Executing Enhanced Training Monitoring Checkpoints

S230, which includes creating one or more training run checkpoints, may function to create a checkpoint, at each of a plurality of distinct intervals of a model training run. A checkpoint may sometimes be referred to herein as a checkpoint evaluation, training run checkpoint, and/or the like. In a preferred embodiment, S230 may function generate a distinct checkpoint at each point in time along or during a training/training run of a subject model and preferably, at a time when one or more metrics (e.g., accuracy, training loss, etc.) of the subject model may be computed and/or evaluated (e.g., against a validation test set or the like). Accordingly, a checkpoint may include a collection or corpus of data associated with a distinct training run of a subject model that preferably includes computed performance values of the subject model and that may be stored with the hyperparameter tuning service as a reference for performing one or more additional services, such as advance curtailment instruction computation.

In one or more embodiments, for each distinct checkpoint, S230 may function to collect the model training run data via an intelligent API of the hyperparameter tuning service thereby creating a corpus of checkpoint data (training run data). In one example, a system of a subscriber to the tuning service or a third-party model training service (e.g., Tensorflow, etc.) may function to automatically interface and report model training run data of a subject model directly to the hyperparameter tuning service via the API. The model training run data preferably relates to measurable attributes of a given model training run including, but not limited to, data that identifies a structure of a subject model (e.g., weights, features, etc.), a number of training cycles (i.e., epochs and/or batches) that have been executed, identification of a suggestion set of hyperparameter values (i.e., service-suggested values) implemented with the subject model that is being trained, a total training time lapse in the training run, a number of training cycles or epochs remaining in the training run, an identification of model performance criteria or metrics being evaluated, and/or any observable/measurable attribute of the training run.

Preferably, S230 may function to implement the periodic evaluations (i.e., checkpoints) of a given model training run based on or at a completion of one or more of a plurality of distinct training cycles of the given model training run. For example, in some embodiments, a configuration of a model training run, as set by a subscriber or the like, may include a plurality of epochs (scheduled epochs) or a predefined number of epochs, which together define a full training run for a subject model. For instance, a single epoch may include a complete presentation of a training dataset to be used in training a model. An epoch preferably refers to one full training cycle through a full training dataset where multiple epochs or multiple training cycles make up a model training run. In one example, a model training evaluation interval (i.e., a checkpoint interval) may be defined based on a completion of a training of a subject model through one or more epochs or one or more training cycles. For instance, a checkpoint evaluation may be performed after a completion of every single epoch or every single training cycle in a model training run that may be scheduled to execute forty (40) epochs and thus, 40 checkpoints before a training of a subject model is completed. In another example, a checkpoint interval for creating a distinct checkpoint may be set after the completion of sets of five (5) epochs, such that a checkpoint evaluation may be performed after 5, 10, 15, 20 epochs, and so on until a model training run is complete. It shall be known that a checkpoint evaluation may be performed or a checkpoint may be created after any suitable interval during a model training run. In a preferred embodiment, the checkpoint evaluation interval may be set as a parameter at a configuration of the hyperparameter tuning request augmented with enhanced model training monitoring.

It shall be noted that while, in one or more embodiments, S230 may function to perform and/or collect checkpoint data periodically, in some additional or alternative embodiments, S230 may function to collect checkpoint data in a continuous manner. In such embodiments, a subscriber's system or a third-party model training service that is training a subject model may function to interface with the API of the hyperparameter tuning service to provide a continuous (live, real-time, or substantially real-time) stream of model training run data for the subject model. Accordingly, in such embodiments, S230 may function to continuously or selectively (e.g., service-selected timings) perform checkpoint evaluations of the model training run data or the like.

In a variant implementation, the checkpoint evaluation interval may be dynamically and/or intelligently set or suggested to a subscriber by the hyperparameter tuning service based historical model training run data. In yet another variation, S230 may function to intelligently and/or dynamically set or reset a checkpoint evaluation interval for a given model training run based on model training performance metrics. For instance, if S230 determines that performance metrics of a subject model may be converging to desired or optimal performance metric values, S230 may function to increase a frequency (and thus, shortening checkpoint intervals) of checkpoint evaluations since one or more performance metrics may be rapidly approaching a performance (convergence) threshold or additionally, or alternatively, S230 determines that performance metrics of a subject model may not be improving or an incremental improvement of the performance metrics of the subject model are below a threshold.

It shall be recognized that, while intervals and/or a frequency for implementing a checkpoint evaluation may be set based on epochs (i.e., an epoch-based interval), S230 may function to set a frequency and/or an interval for checkpoint evaluations based on any suitable training timing measure including based on a completion of training a subject model on a predetermined number of batches or the like. In such embodiments, a full training dataset for a training cycle or epoch may be divided into distinct batches of training data (i.e., a subset of the full training dataset) and thus, intervals for checkpoint evaluations may be set according to a completion of training a subject model on a certain number of batches of training data (e.g., 4 out of 8 total batches of training data) of the full training dataset.

Additionally, or alternatively, based on a parameter or criteria of the tuning request, S230 may function to begin a collection of model training run data and performing evaluations only after a predetermined number of epochs for training a subject model have been completed. In some embodiments, the interval for starting the checkpoint evaluations may be distinct from the intervals between checkpoints that are performed after the initial checkpoint of a model training monitoring.

2.4 Advanced Model Training Run Curtailment

S240, which includes at each of a plurality of distinct intervals of a model training run, computing advanced training curtailment instructions for a training run of a subject model. That is, S240 may function to compute an advanced training curtailment/termination instruction that enables an automated stop or an automated termination of a training process of a subject model that is executed in lieu of some predefined stopping parameter of the training process. In one or more embodiments, an advanced training curtailment/termination instruction may include a model training decision that causes an early disposal or ejection of a subject model from an active and/or real-time training process/run in advance of a full training schedule. In such embodiments, the early disposal or ejection of the subject model from the active training run may be immediate or near real-time (e.g., within 0-600 seconds) of providing the advanced training curtailment instructions to a subscriber or third-party model training service or system. Accordingly, an advanced curtailment instruction may function to control an operational state of a given model training run that includes maintaining a continued (continuation) operation of a model training run, a real-time or immediate termination (discontinuation) of a model training run, or a modification of an extent of the model training run (as described in more detail below).

In a preferred embodiment, S240 may function to compute an advanced training curtailment instructions based on at least on the checkpoint evaluation data, as described in S230.

In a first implementation, S240 may function to compute advanced training curtailment instructions for a given training run based on a lookback parameter of the tuning request associated with the hyperparameter tuning experiment and model training monitoring of a subject model. The lookback parameter as referred to herein preferably relates to a number of historical checkpoints that may be considered as a reference in computing a current in time advanced training curtailment instructions. For example, a lookback parameter that may be set at a value of two (2) may function to instruct the hyperparameter tuning service to consider and/or reference one or more checkpoints (or checkpoint data) of 2 checkpoints prior to an instant or current checkpoint. Still referencing the example, S240 may function to compute advanced training curtailment instructions for a fifth ($5^{th}$) checkpoint of a model training run in which a lookback parameter of 2 (e.g., lookback=2) may be set. In this example, S240 may function to compute the advanced training curtailment instructions for the $5^{th}$ checkpoint based on referencing data from the $3^{rd}$ and $4^{th}$ checkpoints of the model training run since the $3^{rd}$ and $4^{th}$ checkpoints are the 2 most recent historical checkpoints from the $5^{th}$ checkpoint.

Accordingly, S240 may function to evaluate one or more performance metric values of a subject model evaluated at a current checkpoint against one or more performance metric values of one or more historical checkpoints (as identified by the lookback parameter) and determine whether the one or more performance metric values of the current checkpoint improves over the one or more performance metric values of the one or more historical checkpoints. In some embodiments, the measure of improvement may be based on a minimum improvement threshold such that S240 may function to determine that a current checkpoint improves over one or more historical checkpoints of a training run if the improvement of the performance metric values of the current checkpoint satisfies or exceeds a minimum improvement amount or value. Thus, in such embodiments, it may be possible that a current checkpoint improves over a prior checkpoint but not satisfy the minimum improvement threshold. Accordingly, the improvement may not be satisfactory or adequate and as such, S240 may function to determine that the one or more performance metric values of a current checkpoint do not improve over the one or more performance metric values of the one or more performance metric values of the one or more historical checkpoints.

It shall be noted that a number of different metrics of a subject model may be evaluated at each checkpoint of a training run. In a preferred embodiment, S240 may consider only the metrics of the subject model that are linked with the tuning service-suggested hyperparameter values when computing an advanced training curtailment instructions for a training run. That is, in one or more embodiments, S220 may function to generate one or more values for hyperparameters of a model that optimize one or more subscriber-specified metrics (e.g., classification accuracy, etc.). Accordingly, in one example, S240 may function to evaluate only the one or more subscriber-specified metrics (e.g., classification accuracy) which were a subject or object of a hyperparameter tuning experiment for the subject model.

In one or more embodiments, if S240 determines that a current checkpoint fails to improve over one or more historical checkpoints of a given training run, S240 may function to compute advanced training curtailment instructions that instruct or suggest a termination of the training run prior to a predefined training run schedule or maximum training run time.

In some embodiments, S240 may additionally or alternatively augment and/or include with a positive advance training curtailment instructions a rationale or a reason that supports an instruction to terminate or otherwise curtail a training run of a given model. In such embodiments, S240 may function to generate a termination rationale or termination reason based on the evaluation of the one or more performance metrics of a given checkpoint. For instance, if a current checkpoint fails to improve over a prior or historical checkpoint that may have been used as a reference (e.g. comparison) in a computation of curtailment instructions, S240 may function to generate a termination rationale that explains the one or more failures of a current training run to improve or further improve a performance metric of a subject model.

In a variant of this first implementation, a lookback parameter may be set such that only a single historical checkpoint may be evaluated in S240. Referring to the prior example, for computing advanced training curtailment instructions for a $5^{th}$ checkpoint with a lookback parameter set at 2, S240 may function to reference and/or consider only data from the $3^{rd}$ checkpoint in a sequence of previous checkpoints from a given training run. In a further variation, multiple distinct lookback parameters may be set (e.g., lookback=1, 3, 6, etc.).

In a second implementation, S240 may function to compute advanced training curtailment instructions for a given training run based on a rolling average of a plurality of historical checkpoints. In some embodiments, a rolling or moving average may be calculated based on a predefined value N, where is relates to the most recent (e.g., trailing) number of historical checkpoints in a series of checkpoints for a given training run prior to a current checkpoint, which may be the subject of an advanced training curtailment computation. In a preferred embodiment, N may be set as a rolling average parameter within the tuning request. Additionally, or alternatively, N may be dynamically computed or determined by the tuning service based on historical N values in prior, cognate advanced training curtailment computations and/or the like.

In a third implementation, S240 may function to compute advanced training curtailment instructions for a given training run based on tuning-service generated intelligent stopping values. In this third implementation, S240 may function to reference and/or use as input a collection of historical observation data (i.e., observed results of one or more hyperparameter tuning experiments and/or model training run objects/monitorings, etc.) and predict or compute expected checkpoint data values for a given training run. That is, S240 may function to intelligently calculate expected performance metric values for each of a plurality of distinct checkpoints for a subject model of a given training run based on historical observation data of prior model training monitoring experiments and the like. In a preferred embodiment, the historical observation data includes historical tuning experimental data, model training monitoring data, and/or advance training curtailment recommendation data derived from a prior version of a subject model that is being trained in a current training run. In other words, in some embodiments, S240 may function to collect into checkpoint data and training curtailment/termination instructions data (i.e., observations) from one or more prior training runs involving the subject model and feed the collected checkpoint data and the training curtailment/termination instructions data, as input, into an optimization service of the hyperparameter tuning service that builds or generates one or more expected outcomes (e.g., expected performance metric values, etc.) for a real-time or current training run involving the subject model.

In this third implementation, for each given checkpoint of a given training run, S240 may function to compare and/or evaluate one or more performance metric values of a subject model at a current checkpoint of a training run against service-generated expected checkpoint values. In such embodiments, the service-generated expected checkpoint values may include one or more expected/probabilistic performance metric values for the subject model at a given checkpoint. S240 may function to generate a distinct service-generated expected checkpoint for each of a plurality of distinct checkpoints of a training run, such that each of the plurality of distinct checkpoints of the training run has a corresponding service-generated expected checkpoint that may be used for advanced training curtailment computations.

Further, in the evaluation of a current checkpoint, if the one or more performance metric values derived from the checkpoint fail to match or satisfy the service-generated expected checkpoint data, S240 may function to compute or generate advanced training curtailment instructions for causing a cancellation of the training run of a subject model before a maximum training time (threshold) for the training run has been reached.

It shall be noted that S240 may function to implement any suitable combination of the above-implementations for evaluating checkpoint data and computing advanced training curtailment instructions.

In some embodiments, S240 may additionally or alternatively, compute advanced training termination instructions that encourage and/or otherwise automatically modifies an extent of the predefined full training schedule of a training run for a subject model. For example, in some embodiments, S20 may function to compute advanced training curtailment instructions that automatically function to abbreviate or shorten but not cancel a predefined full training schedule of a training run. In such example, the predefined full training schedule may include a requirement to execute fifty (50) epochs with a subject model. The advance training curtailment instructions, however, may instruct or suggest an abbreviation of the training run from 50 epochs to forty (40) epochs based on a determination that a convergence or other desired training state of subject model may be achieved in a shorter period or with a lesser number of epochs.

S2.45 Executing Advanced Training Curtailment Instructions

Optionally, or additionally, S245 may function to return advance training curtailment instructions via the API of the hyperparameter service based on a query to the API. In some embodiments, after each checkpoint evaluation (S230) performed by the hyperparameter tuning service, a subscriber and/or a third-party model training service may function to query the API of the hyperparameter service to determine whether an active or ongoing model training run should be terminated and not executed to completion. Preferably, in such embodiments, the query to the API from the subscriber or the like may include a specific request for advanced model training curtailment instructions together with a suggestion identifier, a training run identifier, a checkpoint identifier, and/or any suitable identifier that may be used by the hyperparameter tuning service to discover and return results of a given checkpoint evaluation.

In one or more embodiments, in response to receiving the query to the API, S245 may function to create an observation object and report that includes, at least, the advanced model training curtailment instructions indicating whether or not a corresponding training run should be continued or discontinued and a reasoning or rationale for the curtailment instructions. In some embodiments, if multiple curtailment criteria are passed into the hyperparameter tuning service for a training monitoring job, the reasoning or rationale included for and with the advanced training curtailment instructions may specifically identify which of the multiple model performance criteria satisfy advanced training curtailment criteria.

2.5 Global Observation

Optionally, or additionally, S250 may function to create a global observation object based on a completion of the first part and the second part of the tuning request. In one or more embodiments, after a completion of each of the hyperparameter tuning of the one or more hyperparameters of a subject model and the training monitoring of one or more training runs of the subject model, S250 may function to aggregate into a single global observation object data from the hyperparameter tuning derived from an execution of the first part and training monitoring data including an aggregation of all checkpoint data from each distinct checkpoint.

In some embodiments, S250 may function to return the global observation object based on a query from a subscriber to the API. Additionally, or alternatively, S250 may function to implement the global observation object as input that informs one or more modifications to subsequent tuning experiments for hyperparameters of the subject model.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for tuning hyperparameters of a model and intelligent model training, the method comprising:
    accessing a tuning request received via an application programming interface of a hyperparameter tuning service, the hyperparameter tuning service to tune hyperparameters of a model, the tuning request including:
        (i) tuning parameters to generate tuned hyperparameter values for the hyperparameters of the model; and
        (ii) model training control parameters to control a training of the model;
    monitoring the training of the model based on the model training control parameters, the monitoring of the training includes collecting training run data;
    generating a first checkpoint and a second checkpoint based on the training run data after at least one epoch of the training of the model;
    generating an improvement measure by evaluating first performance metrics of the first checkpoint relative to second performance metrics of the second checkpoint; and
    computing an advanced training curtailment instruction based on the improvement measure, the training curtailment instruction to automatically curtail the training prior to a predefined maximum training schedule of the training.

2. The method according to claim 1, further including generating the first checkpoint of a plurality of checkpoints in response to a computation of the first performance metrics of the model at an end of a corresponding distinct interval of a plurality of distinct intervals of the training the first checkpoint of the plurality of checkpoints includes values of the first performance metrics of the model computed at the end of the corresponding distinct interval.

3. The method according to claim 1, wherein the computing of the advanced training curtailment instruction includes:
    identifying first values of the first performance metrics of the model for the first checkpoint of a plurality of checkpoints;
    selecting the second checkpoint as a historical checkpoint from the plurality of checkpoints;
    assessing the first values of the first performance metrics of the model of the first checkpoint against second values of the second performance metrics of the model from the second checkpoint; and
    identifying whether to curtail the training run based on the assessment.

4. The method according to claim 3, wherein the computing of the advanced training curtailment instruction is based on the assessment, if the first values of the first performance metrics of the model of the first checkpoint satisfy an improvement threshold over the second values of the second performance metrics of the model from the second checkpoint.

5. The method according to claim 1, wherein the advanced training curtailment instruction includes:
    (a) whether or not to curtail the training before completion of all training cycles of the training; and
    (b) a rationale that identifies which of the first performance metrics of the first checkpoint that satisfy or does not satisfy the one or more criteria for generating instructions to curtail the training of the model.

6. The method according to claim 1, wherein the computing of the advanced training curtailment instruction includes:
    identifying first values of the first performance metrics of the model for the first checkpoint;
    computing a rolling average value for ones of the first performance metrics of the model based on the first values of the first performance metrics of the model and second values from two or more historical checkpoints of the training; and
    identifying whether to curtail the training based on assessing the first values of the first performance metrics of the model of the first checkpoint against the rolling average value.

7. The method according to claim 1, wherein the computing of the advanced training curtailment instruction includes:
    computing a plurality of expected checkpoints based on the training run data, one of the plurality of expected checkpoints including probabilistically expected values for one or more performance metrics at a given interval during the training of the model, and the ones of the plurality of expected checkpoints corresponding to one of the plurality of expected checkpoints; and
    identifying whether to curtail the training based on assessing first values of the first performance metrics of the model of the first checkpoint against the second checkpoint from the plurality of expected checkpoints.

8. The method according to claim 1, wherein the tuning request is configured to include at least:
    an identification of one or more of the hyperparameters of the model; and
    an identification of the first performance metrics of the model.

9. The method according to claim 1, wherein the tuning request is configured to include at least:
    a setting of a plurality of distinct intervals during the training at which ones of a plurality of checkpoints are generated;
    a setting of a maximum number of checkpoints for the training; and a setting of a lookback parameter that indicates a number of a plurality of historical checkpoints that are referenced in the computation of the advanced training curtailment instruction.

10. The method according to claim 1, wherein the advanced training curtailment instruction includes a model training decision that, when executed, causes an early disposal or an early ejection of the model from the training that is in progress ahead of the predefined maximum training schedule of the training.

11. The method according to claim 1, wherein the advanced training curtailment instruction controls an operational state of the training that includes one or more of maintaining a continued operation of the training, a real-time or an immediate discontinuation of an operation of the training, and a modification of an extent of the operation of the training.

12. The method according to claim 1, wherein the model training control parameters include a frequency parameter that sets a frequency for creating ones of a plurality of checkpoints during the training for the model.

13. The method according to claim 12, wherein the hyperparameter tuning service creates instructions to dynamically change the frequency parameter that, when executed, increases or decreases the frequency for creating ones of the plurality of checkpoints during the training for the model.

14. The method according to claim 1, wherein the hyperparameter tuning service creates instructions to change a number of training epochs in the training based on a proximity of the first performance metrics of the model to a convergence threshold.

15. The method according to claim 1, wherein the hyperparameter tuning service staggers an execution of a first part of the tuning request including the tuning parameters from an execution of a second part of the tuning request including the model training control parameters by executing the first part at a time earlier or before an initialization and execution of the second part.

16. An apparatus to tune hyperparameters of a model and intelligent model training, the apparatus comprising:
memory; and
a processor to:
access a tuning request received via an application programming interface of a hyperparameter tuning service, the tuning request including:
(i) tuning parameters to generate tuned hyperparameter values for the hyperparameters of the model; and
(ii) model training control parameters to control a training of the model;
monitor the training of the model based on the model training control parameters, the monitoring of the training includes collecting training run data;
generate a first checkpoint and a second checkpoint based on the training run data after at least one epoch of the training of the model;
generate an improvement measure by evaluating first performance metrics of the first checkpoint relative to second performance metrics of the second checkpoint; and
compute an advanced training curtailment instruction based on the improvement measure, the training curtailment instruction to automatically curtail the training prior to a predefined maximum training schedule of the training.

17. The apparatus according to claim 16, wherein the processor is to generate the first checkpoint of a plurality of checkpoints in response to a computation of the first performance metrics of the model at an end of a corresponding distinct interval of a plurality of distinct intervals of the training, the first checkpoint of the plurality of checkpoints including values of the first performance metrics of the model computed at the end of the corresponding distinct interval.

18. The apparatus according to claim 16, wherein the processor is to compute the advanced training curtailment instruction by:
identifying first values of the first performance metrics of the model for the first checkpoint of a plurality of checkpoints;
selecting the second checkpoint as a historical checkpoint from the plurality of checkpoints;
assessing first values of the first performance metrics of the model of a first checkpoint against second values of the second performance metrics of the model from the second checkpoint; and
identifying whether to terminate the training run based on the assessment.

19. A method for tuning hyperparameters of a neural network and intelligent neural network training, the method comprising:
accessing a tuning request received via an application programming interface of a hyperparameter tuning service, the tuning request including:
(i) tuning parameters to generate tuned hyperparameter values for the hyperparameters of the neural network; and
(ii) neural network training control parameters to control a training of the neural network;
monitoring the training of the neural network based on the neural network training control parameters, the monitoring of the training includes collecting checkpoint data;
generating a first checkpoint and a second checkpoint based on training run data after at least one epoch of the training of the neural network;
generating an improvement measure by evaluating first performance metrics of the first checkpoint relative to second performance metrics of the second checkpoint; and
computing an advanced training curtailment instruction based on the improvement measure, the training curtailment instruction to automatically curtail the training prior to a predefined maximum training schedule of the training.

20. The method according to claim 19, wherein:
the checkpoint data includes the first performance metrics of the neural network corresponding to a first end of a first one of a plurality of distinct periods during the training and the second performance metrics of the neural network corresponding to a second end of a second one of the plurality of distinct periods during the training; and
the improvement measure indicates:
whether the second performance metrics of the second checkpoint satisfy a convergence threshold indicating an improvement over the first performance metrics of the neural network.

* * * * *

UNITED STATES PATENT AND TRADEMARK OFFICE
CERTIFICATE OF CORRECTION

| | | |
|---|---|---|
| PATENT NO. | : 11,157,812 B2 | Page 1 of 1 |
| APPLICATION NO. | : 16/849422 | |
| DATED | : October 26, 2021 | |
| INVENTOR(S) | : Michael McCourt et al. | |

It is certified that error appears in the above-identified patent and that said Letters Patent is hereby corrected as shown below:

On the Title Page

Item (72) Replace "Taylor Jackie Springs" with --Taylor Jackle-Spriggs--

Signed and Sealed this
Sixteenth Day of August, 2022

Katherine Kelly Vidal
*Director of the United States Patent and Trademark Office*